J. M. YOUNG.
CAN SOLDERING APPARATUS.
APPLICATION FILED MAY 28, 1914. RENEWED OCT. 23, 1916.
1,251,729.
Patented Jan. 1, 1918.
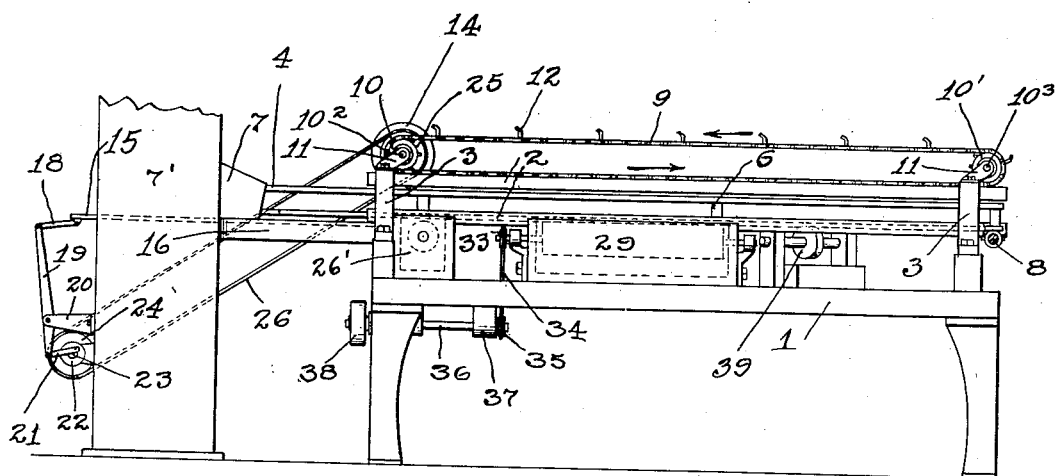
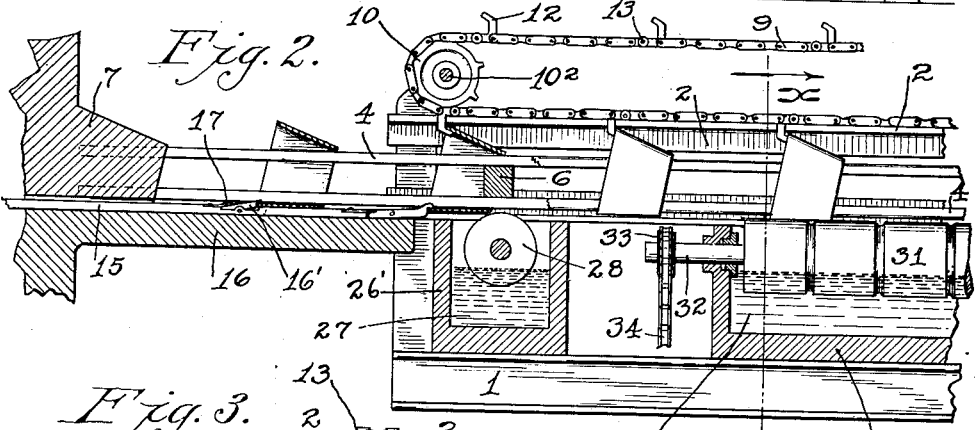
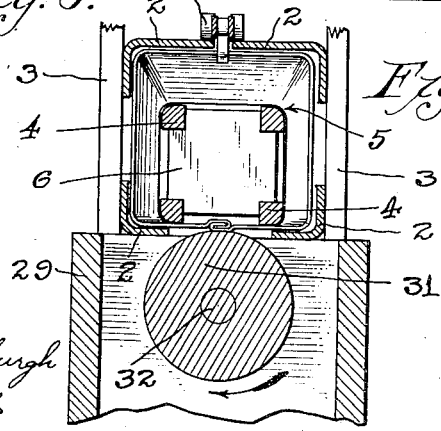
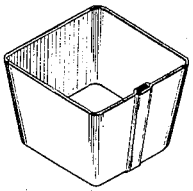
WITNESSES:
INVENTOR.
John M. Young
BY
ATTORNEY

UNITED STATES PATENT OFFICE.

JOHN M. YOUNG, OF SAN FRANCISCO, CALIFORNIA, ASSIGNOR TO AMERICAN CAN COMPANY, OF SAN FRANCISCO, CALIFORNIA, A CORPORATION OF NEW JERSEY.

CAN-SOLDERING APPARATUS.

1,251,729.   Specification of Letters Patent.   Patented Jan. 1, 1918.

Application filed May 28, 1914, Serial No. 841,609. Renewed October 23, 1916. Serial No. 127,312.

*To all whom it may concern:*

Be it known that I, JOHN M. YOUNG, a citizen of the United States, residing at the city and county of San Francisco and State of California, have invented certain new and useful Improvements in Can-Soldering Apparatus, of which the following is a specification.

The present invention relates to improvements in soldering machines and more particularly to a type of machine employed in soldering the side seam of a square tapered can of the type employed for canning corned beef or the like, and the invention has for its principal objects to provide a machine employed in connection with a body forming horn which is capable of rapidly and efficiently soldering the side seam of square tapered sided can bodies; one which is entirely automatic in all of its operations, whereby the work of soldering the above type of can bodies is materially expedited and by so doing materially increasing the output of a can making factory and correspondingly reducing the cost of soldering the side seams of can bodies of the above type.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction may be resorted to without departing from the spirit or sacrificing any advantages of the invention.

To more fully comprehend the invention reference is directed to the accompanying sheet of drawings wherein—

Figure 1 is a view in side elevation of my improved machine.

Fig. 2 is a longitudinal sectional view disclosing the cans carried along the solder roll.

Fig. 3 is a section taken on line $x$—$x$ of Fig. 2.

Fig. 4 is a perspective view of a square taper can.

Referring more particularly to the drawings, in which like characters of reference designate corresponding parts throughout the several views, the numeral 1 indicates a suitable oblong supporting frame, longitudinally of which extends a guide casing comprising the angular corner irons 2 supported by the members 3 extending upwardly from the sides of the frame 1. Extending longitudinally within the guide casing for its full length is a can guide frame rectangular in cross section and comprising the four corner members 4 having the outer rounded corner surfaces 5, and said members are united together at intervals throughout their length by the spacing members 6. One end of each of the corner members 4 is secured in any suitable manner in a body forming horn 7, positioned at one end of the frame and which is the shape of the finished can body, said horn being carried by a support 7', and the opposite ends of said lower corner members rest on a roller 8 carried at one end of the lower corner irons 2. The can bodies to be soldered are formed on the horn 7 by any suitable mechanism of the well known type, and the side seams thereof are crimped while on said horn by any mechanism of the well known type; it not being thought necessary to illustrate the body forming or seaming mechanisms as both are of the well known type.

It will be apparent from Fig. 3 of the drawings, that the cross sectional area of the can guide frame is substantially the same as the shape and configuration of the small end or base of the can body and fits within the same, and that the can guide casing is of substantially the same size and shape as the large end of the can body and longitudinally within said can guide casing the can body is propelled.

The formed can bodies are carried longitudinally of the guide frame and longitudinally within the guide casing by an endless chain conveyer 9 which operates over sprockets 10 and 10' carried by shafts $10^2$ and $10^3$ supported by brackets 11 positioned at each end of the upper corner members 4 of the guide casing and directly over the space between the same. The conveyer chain operates in the direction of the arrow—Fig. 1, and is provided at spaced intervals throughout its length with hooked can body engaging members 12, which are adapted on the rearward movement of the conveyer to project downwardly through the space between the upper corner members 4 and engage beneath the upper edge of the can bodies as in Fig. 2.

Suitable idlers 13 carried by the opposite sides of the chain conveyer adjacent the hooked members 12 ride upon the upper side edges of the upper corner members 4 and prevent the chain from falling through the space between the upper members 4. A power wheel 14 is carried by the shaft 10² and the same is rotated by power received from any suitable source to operate the conveyer chain 9.

The can bodies are conveyed from the body forming horn 7 to a point to be engaged by the members 12 by the reciprocating conveyer rod 15 which rests on a plate 16 connecting the support 7' with the forward end of lower corner irons 2 and extends longitudinally of the center of that portion of the guide frame adjacent the body forming horn 7. The end of the rod 15 adjacent the chain conveyer is provided with a plurality of pivoted catches 16' the forward ends of which are upwardly pressed, as in Fig. 2, by the springs 17 and said catches, when the rod 15 is reciprocated in a hereinafter described manner, alternately engage the under surface of the can body after the same has been formed on the horn and cause the same to be advanced to a position to be engaged by the engaging members 12. The conveyer rod extends under the horn 7 and through the support 7' and to the projecting end thereof is connected by a link 18 one end of a walking beam 19 pivoted adjacent its center to a bracket 20 and connected at its opposite end to a link 21 which is mounted eccentrically of a hub 22 carried by a rotary shaft 23. The shaft 23 carries a drum 24 around which and a suitable drum 25 on the shaft 10², extends a belt 26 which rotates the shaft 23 to operate the walking beam.

A flux receptacle 26' is carried by the frame 1 beneath the forward end of the can guide casing, and rotatably mounted in said receptacle and adapted to contact with the body of flux 27 in said receptacle is an applying roller 28 which is adapted to extend upwardly in the space between the lower corner irons 2 in a position to contact with and apply the flux to the can side seam as the same is conveyed thereover.

Mounted on the frame 1 in rear of the flux receptacle 26' is a solder pot or receptacle 29 adapted to contain a body of solder 30 which is maintained in a molten state by any suitable mechanism, and rotatably mounted in said receptacle is an applying roll 31 which is immersed in the solder body 30 and extends upwardly between and longitudinally of the lower corner irons 2 in a position to contact with and apply molten solder to the can body side seam, as the same is conveyed longitudinally thereof and after the flux has been applied thereto.

The ends of the shaft 32 which support the solder applying roll 31 extend outwardly beyond the ends of the receptacle and to one of the same is secured a sprocket 33 which is connected by a chain 34 with a sprocket 35 carried by a shaft 36 rotatably mounted beneath the frame 1 in bearings 37, and said shaft carries a belt wheel 38 which receives power from any suitable source to drive the solder applying roll in the direction of the arrow—Fig. 3.

In the rear of the solder applying roll 31 is rotatably mounted a wiping roll 39 over which the cans are caused to pass after the side seams thereof have been soldered, and the side seams of the cans as forced in contact with the wiping roll cause the same to rotate angularly to the path of travel of the cans, and said roll in its angular rotation wipes off or removes any excess solder from the side seam.

The can bodies with their soldered side seam after passing the wiping roll are conveyed from the end of the guide casing and guide frame and are deposited in any suitable receptacle, not shown.

It will be apparent that by providing the body guide frame with the guide casing and of a size and configuration of the small or bottom end of the can body and passing the can bodies thereover, the can bodies will be prevented from lateral movement relative to the can body guide frame and casing, and the weight of the frame within the bodies, and the sagging of the same within the guide casing, will cause the can side seams to be forced into contact with the flux, solder and wiping rolls, and the side seam will be thoroughly fluxed, soldered and wiped.

By rotating the solder applying roll in the direction of the arrow—Fig. 3, the solder applied to the side seam will be forced into the exposed joint thereof.

Having thus described my invention what I claim as new and desire to protect by Letters Patent is:—

1. An apparatus for soldering the side seam of flat sided tapered can bodies and in combination with associated soldering devices comprising a can body guide frame over which said can bodies are conveyed, said guide frame being of a size and configuration of the small end of said can bodies, a guide casing carried by said supporting frame and surrounding said guide frame and through which said can bodies are conveyed, said guide casing being of a size and configuration of the large end of said can bodies, means for conveying the can bodies longitudinally of said guide frame and casing, said guide frame and guide casing serving to maintain the can body side seam in coöperative relation with the associated soldering devices.

2. An apparatus for soldering the side seam of flat sided tapered can bodies and in combination with a forming horn and associated soldering devices comprising a supporting frame, a can body guide extending from and secured at one end to said horn and resting at its opposite end on said frame and over which said can bodies are conveyed, said guide being of a size and configuration of the small end of said can bodies, a guide casing supported by said supporting frame and surrounding said guide and through which said can bodies are conveyed, said guide casing being of a size and configuration of the large end of said can bodies, means for conveying the can bodies from said horn and longitudinally of said guide frame and casing, said guide and guide casing serving to maintain the can body side seam in coöperative relation with the associated soldering devices.

3. An apparatus for soldering the side seam of tapered can bodies and in combination with soldering mechanism, a guide frame of the size and configuration of the small end of the can body and around which the body passes, a guide casing of the size and configuration of the large end of the can body and through which the body passes, and means for propelling the can body relative to said guide frame and casing, said guide frame and casing maintaining a can seam in coöperative relation with the soldering mechanism.

4. An apparatus for soldering the side seam of tapered can bodies and in combination with soldering mechanism, a guide for coöperation with the small end of the can body and over which the body passes, a guide casing surrounding said first mentioned guide and through which the large end of the can body passes in contact therewith, and means for propelling can bodies relative to said guide and guide casing, said guide and guide casing maintaining the can seam in coöperative relation with the soldering mechanism.

In testimony whereof I have signed my name to this specification in the presence of two subscribing witnesses.

JOHN M. YOUNG.

Witnesses:
 HARRY G. TOTTEN,
 D. B. RICHARDS.